Patented Aug. 22, 1944

2,356,569

UNITED STATES PATENT OFFICE 2,356,569

INTERMEDIATES FOR DYESTUFFS

Polydoor De Smet and Willem Mees, Mortsel, near Antwerp, Belgium; vested in the Alien Property Custodian No Drawing. Application May 20, 1941, Serial No. 394,288. In Great Britain December 12, 1939

8 Claims. (Cl. 260—298)

This invention relates to the manufacture of intermediates for dyestuffs of the general formula:

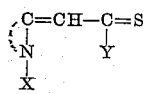

wherein X is an alkyl or a substituted alkyl, such as for instance aralkyl, Y is an alkyl or a substituted alkyl, such as for instance aralkyl, while the group

is a five member cyclic group containing sulphur and selenium such as for instance thiazole, selenazole or the like which may be substituted by alkyl, phenyl, phenylene or any polynuclear ring.

These new substances, which may be considered as being thioketone derivatives of heterocyclic compounds, readily react with reactive alkyl- or methylene groups under formation of hydrogen sulphide, so that they are useful intermediates in the preparation of dyestuffs, such as symmetrical and asymmetrical carbocyanines or merocyanines.

These thioketones can also be used in the preparation of other intermediates for dyestuffs.

According to the invention these new compounds are prepared by reacting acid halides with 2-alkyl derivatives of quaternary cyclammonium salts i. e. a quaternized, heterocyclic nitrogen compound, the heterocyclic base in which through quaternization has become a cyclic base in the presence of sulphurizing-compounds such as phosphorus pentasulphide, preferably in an acid-binding solvent such as for instance pyridine.

*Example 1.*—Preparation of (N-ethyl-benzthiazolidene-methyl)-methylthioketone:

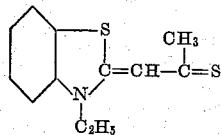

350 g. 2-methyl-benzthiazol-ethyl-toluenesulphonate and 150 g. phosphorus pentasulphide are thoroughly mixed. To this mixture are added 1300 ccm. dry pyridine, which previously have been cooled to below 5° C. After recooling under 5°, 100 g. acetylchloride are slowly added, the temperature being kept below 5°. After ¼ hour the temperature is allowed to rise to room temperature under repeated shaking and the whole is finally heated ½ hour in a boiling water bath.

The pyridine is evaporated in vacuo and the dark-brown colored residue washed with water; during the washing the product solidifies. After thorough drying in a vacuum-dessicator it is recrystallized from benzine (boiling point 120/140° C.). The yield is 48.5 g. (20%).

After recrystallization from ethyl alcohol, yellow brown needles are obtained which melt at 146° C.

Determination of S: 26.73%. Calculated amount: 27.2%.

*Example 2.*—Preparation of (N-methyl-benzthiazolidene-methyl)-ethylthioketone:

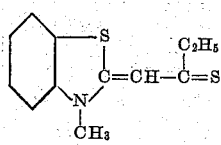

275 g. 2-methyl-benzthiazol-dimethylsulphate and 150 g. phosphorus pentasulphide are thoroughly mixed. To this mixture are added 1300 ccm. cold, dry pyridine.

After cooling to below 5° C., 120 g. propionylchloride are slowly added, the temperature being kept below 5° C. After ¼ hour the temperature is allowed to rise to room temperature under repeated shaking and the reaction mixture is finally heated ½ hour in a boiling water-bath.

The pyridine is evaporated under reduced pressure and the dark-brown colored residue washed with water; during washing the product solidifies. After thorough drying in a vacuum-dessicator, the crude product is recrystallised from benzine (boiling point 120°/140° C.). The yield is 95 g. (40%).

After recrystallisation from ethyl alcohol, yellow needles, melting at 155°–156°, are obtained.

Determination of S: 27.7%. Calculated amount: 27.23%.

*Example 3.*—Preparation of (N-ethyl-4-5-benzo-benzthiazolidene-methyl)-methylthioketone:

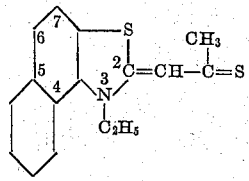

400 g. 2-methyl-4-5-benzo-benzthiazol-ethyl-toluene-sulphonate and 150 g. phosphorus pentasulphide are thoroughly mixed. To this mixture are added 1500 ccm. dry pyridine, which were cooled to below 5° C. After recooling below 5° C., 100 g. acetylchloride are added gradually, the temperature being always held below 5° C. After ¼ hour the temperature is allowed to rise to room temperature and finally the mixture is heated ½ hour in a boiling water-bath.

The pyridine is evaporated in vacuo and the dark-brown residue washed with water. The solidified product is dried in a vacuum-dessicator and recrystallized from benzine (boiling point: 120°/140°).

Recrystallization from ethyl alcohol gave yellow brown needles, melting at 194° C.

Determination of S: 22.8%. Calculated amount: 22.5%.

Example 4.—Preparation of (N-ethyl-benzselenazolidene-methyl)-methyl thioketone:

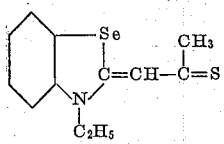

To a mixture of 350 g. 2-methyl-benzselenazol-ethyliodide and 150 g. phosphorus pentasulphide are added 2000 ccm. cold, dry pyridine. After recooling below 5° C., 100 g. acetylchloride are slowly added, the temperature being held below 5° C. After ¼ hour the temperature is allowed to rise to room temperature under repeated shaking and the reaction mixture is finally heated ½ hour in a boiling water-bath.

The pyridine is distilled off in vacuo and the dark-brown colored residue washed with water; during washing the crude product solidifies. After thorough drying it is recrystallised from benzine (boiling point 120°/140°). The yield is 90 g. (32%).

After recrystallising it from ethyl alcohol, brown-red needles, melting at 136°–138°, are obtained.

Example 5.—Preparation of (N-methyl-benzthiazolidene-methyl)-phenyl-thioketone

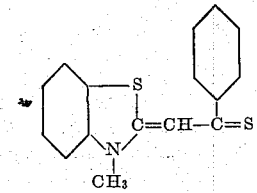

275 grams finely divided 2-methyl-benzthiazol-dimethyl-sulfate and 150 grams phosphorus pentasulphide are mixed with 1000 ccm. cold, dry pyridine. The mixture is chilled below 5° C. and 175 g. benzoylchloride are slowly added under good stirring and cooling. After ¼ hour the temperature is allowed to rise to room temperature and under repeated shaking the mixture is finally heated half an hour in a boiling water bath under the reflux condenser. After evaporation of the pyridine in vacuo, the dark colored residue is treated with cold water until it becomes a solid mass. After thorough washing and drying in a dessicator it is recrystallized from benzine (boiling point 120°/140°). The yield is 168 g. (59%).

Recrystallization from ethylalcohol yielded yellow needles, melting at 176° C.

Determination of S: 21.19% (calculated amount: 22.61%).

Example 6.—Preparation of (N-ethyl-5-methylthiodiazolidene-methyl)-phenyl-thioketone

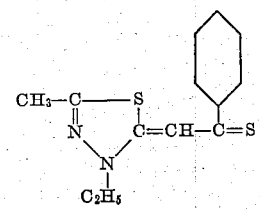

To a finely divided mixture of 270 g. 2-5-dimethyl-thiodiazol-ethyliodide and 150 g. phosphorus pentasulphide are added 1000 ccm. cold, dry pyridine. Under good stirring and cooling, to keep the temperature of the reaction mass below 5° C., 175 g. benzoylchloride are gradually added. After about 15 minutes the temperature is allowed to rise to room temperature and the whole is then heated ½ hour in a boiling water bath under a reflux-condenser.

The pyridine is removed by evaporation under reduced pressure and the red-colored residue is washed with water. It is filtered by suction and dried at low temperature. On recrystallizing the crude product from ethylalcohol, the yield is 165 grams (63%).

Further recrystallization from alcohol gives light-red colored crystals, melting at 165° C.

Determination of S: 24.45% (calculated amount: 24.42%).

Various changes may be made in the details disclosed in the foregoing specification without departing from the invention or sacrificing the advantages thereof.

We claim:

1. The process of producing intermediates for dyes, such intermediates being constituted according to the formula

wherein

is a five member cyclic group containing, besides carbon and nitrogen atoms, a member of the group consisting of sulfur and selenium, while X is a radical of the group constituted by alkyl and a substituted alkyl, and Y is a radical of the group constituted by alkyl, substituted alkyl and phenyl, this process comprising reacting quaternary ammonium salt of said five member cyclic group having an alkyl group linked to the carbon atom which adjoins the nitrogen atom in the heterocyclic ring, in the presence of phosphorus pentasulfide with a halide of a monobasic organic acid.

2. The process of claim 1, in which the reaction is carried through in an alkaline medium.

3. The process of claim 1, in which the reaction is carried through in pyridine.

4. The process of claim 1, in which the reaction is carried through in toluene in the presence of triethylamine.

5. The process of claim 1, in which the quaternary ammonium base is 2-methyl-benzthiazol-alkylsulphonate.

6. The process of claim 1, in which the quaternary ammonium base is 2-methyl-4-5-benzo-benzthiazol-ethyltoluene-sulphonate.

7. The process of claim 1, in which the quaternary ammonium base is 2-methyl-benzselenazol-ethyliodide.

8. The process of claim 1, in which the quaternary ammonium base is 2-5-dimethyl-thiodiazol-ethyliodide.

POLYDOOR DE SMET.
WILLEM MEES.